United States Patent Office 3,347,692
Patented Oct. 17, 1967

3,347,692
METHOD OF COATING ARTICLES WITH GRAFT COPOLYMERS OF POLYPROPYLENE AND ACRYLIC ACID
Lewis J. Young, Sanford, and Joseph E. Burkholder, Midland, Mich., assignors to The Dow Chemical Company, Midland, Mich., a corporation of Delaware
No Drawing. Filed Aug. 26, 1964, Ser. No. 392,272
5 Claims. (Cl. 117—21)

This application is a continuation-in-part of copending application Ser. No. 135,743, filed Sept. 5, 1961, now abandoned.

This invention relates to protective coatings and to a method of producing such coatings on the surfaces of articles. More particularly, it relates to a method of forming smooth, adherent, protective coatings to articles from a fluidized bed of a thermoplastic graft copolymer of (a) from about 75 to 98 percent by weight of polypropylene, and (b) from about 25 to 2 weight percent of acrylic acid per 100 parts by weight of the graft copolymer.

A primary object of this invention is the production of smooth, adherent, coatings of uniform thickness which are particularly suitable for protecting the surfaces of articles exposed to normally destructive solvents, chemicals, or other corrosive agents, and which are resistant to mechanical abrasive or frictional wear.

Another object is to provide a method of producing such adherent coatings using the fluid-bed coating process. A further object is to produce such coating from graft copolymers of polypropylene and acrylic acid.

Other objects and advantages of the invention will be apparent from the following specification.

This invention is particularly valuable for, and applicable, to the production of coated articles from a fluid-bed of thermoplastic coating compositions consisting essentially of graft copolymers of from 75 to 98 percent by weight of polypropylene and from 25 to 2 percent of acrylic acid. Coatings formed by methods of this invention are of uniform thickness with excellent smoothness and resistance to chemicals, solvents, and mechanical abrasive or frictional wear. Such coatings are found to be superior to polyethylene or polypropylene coatings as well as graft copolymer coating compositions consisting of predominant amounts of polyethylene and minor amounts of polymerizable acrylic compounds, and, surprisingly, graft copolymer coating compositions consisting of predominant amounts of polypropylene and minor amounts of methacrylic acid, as well as graft copolymer coating compositions consisting of polypropylene and acrylic acid in amounts outside of these ranges as specified by the present invention.

A fluidized bed is, by definition, a mass of solid particles which exhibits the liquid-like characteristics of mobility, hydrostatic pressure, and an observable upper free surface or boundary zone across which a marked change in concentration of particles occurs. This "fluidized bed" is defined as differing from a "dispersed suspension" because in the latter, an upper level or interface is not formed under conditions of continuous solids entrainment and uniform superficial velocity. (This is usually observed under conditions of low solids concentration and either high fluid velocity or low solids feed rate.) Thus, in general, a dispersed suspension is analogous to a vapor, whereas a fluidized bed is analogous to a liquid. One example of this condition is observed in pneumatic transport. In a vessel containing a fluidized bed a dilute suspension of entrained particles above the bed also is such a dispersed suspension, and is frequently referred to as the "disperse phase" while the bed itself is referred to as the "dense phase." The fluidized bed is thus alternatively defined as a "dense phase." These definitions are to be found in the article entitled "Fluidization Nomenclature and Symbols" appearing at pages 1249 and 1250 in "Industrial and Engineering Chemistry," vol. No. 6, June 1949.

The preheating of the article should be to a temperature above the sintering or melting point of the coating material. By "melting point" is meant that stage wherein the coating material is sufficiently coalesced to provide a continuous coating of the article. By "sintering point" is meant that stage wherein the coating material is sufficiently "tacky" or "sticky" to adhere to the surface of the article.

If required, the coating may be reinforced by repeating the above-described process of application, that is, by reheating and re-dipping the article.

Preferred apparatus for carrying out the process is more fully described in United States Patent 2,844,489.

A graft copolymer as the term is well understood in the art means a base polymer having attached thereto polymer chains of vinyl or vinylidene monomers capable of addition polymerization, and such polymer chains chemically attached to, or combined with, polymer molecules of the trunk or base polymer. Pictorially, this can be represented as follows:

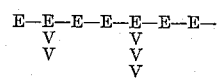

wherein E represents polymerized monomer units of the trunk or base polymer and V represents polymerized monomer units of the grafted-on vinyl or vinylidene monomer.

The graft copolymers can be prepared by reacting acrylic acid with polypropylene having active centers on the polymer molecules capable of initiating the polymerization of vinyl or vinylidene monomers to form addition polymers. Active centers at which grafting will occur can readily be induced on the polyolefin in known ways, e.g. by subjecting the solid polyolefin to the action of high energy ionizing radiations such as gamma rays, X-rays or high speed electrons, preferably in the presence of air or oxygen for a dose of from 0.5 to 10 megarads in a field of high energy ionizing radiations of an intensity of at least 40,000 rods per hour or the equivalent thereof.

The graft copolymer, in powdered or finely divided form, e.g., 1000 microns or smaller is fluidized with a stream of nitrogen preheated at temperatures of about 90° C. Articles to be coated with the fluidized graft copolymer are preheated at temperatures of about 250° C. to 400° C. and are placed in the fluid-bed for periods of about seven seconds. Such articles are post-heated after removal from the fluid-bed at temperatures of about 150° C. to 180° C. for periods ranging from about 5 minutes to 10 minutes, to provide coatings of optimum uniformity and smoothness.

Articles coated by the method of this invention have uniform smooth coatings which are resistant to the corrosive effects of strong acidic and salt solutions.

The following examples illustrate ways in which the principle of the invention has been applied, but are not to be construed as limiting its scope.

Example 1

In each of a series of experiments, molding grade polypropylene in the form of a fine powder was irradiated in air with high speed electrons from a Van de Graaff generator operating at a beam current of about 137 microamperes and 2 mev. potential for a dose of about 3.2 megarads. The irradiated polypropylene was suspended in a solution of ortho-xylene containing glacial acrylic acid. The graft polymerization was carried out in a glass reaction vessel equipped with a reflux condenser and stirrer and under an atmosphere of a pre-purified nitrogen gas by heating the mixture at about 80° C. for one hour. After completing the reaction, the product was separated by filtering and was washed with hot water to remove homopolymer and unreacted acrylic acid, then dried to a constant weight. The products were graft copolymers consisting of from about 75 to 98 percent by weight of polypropylene and from about 25 to 2 percent of acrylic acid.

Test bars of iron, aluminum, stainless steel, magnesium, and Pyrex glass, the dimensions of which were ¼ inch by 1.0 inch by 3.0 inches were separately and individually coated with each polypropylene acrylic acid graft copolymer.

The procedure consisted of, first, preheating the test bars in a Temco muffle furnace (F–1415–T) to temperatures of 250° C. to 400° C. The preheated articles were then immersed in a fluid-bed of the graft copolymer for seven seconds followed by post-heating in a Precision Scientific convection oven at about 150° C. to about 180° C. for 5 to 10 minutes. The fluid-bed consists of the individual graft copolymer having a particle size of about 500 microns. The fluidizing gas was nitrogen, at a supply pressure of about 1.8 p.s.i. and a temperature of 90° C. The thickness of the resulting coatings were about 0.010 inch. For purposes of comparison, individual test bars were also separately and individually coated and evaluated as described herein with the following thermoplastic coating resins; linear polyethylene having a melt index of about 5; branched polyethylene having a melt index of about 58.4; polypropylene having a melt index of about 0.37; a graft copolymer of about 91.6 parts by weight polyethylene and about 8.4 parts by weight acrylic acid; a graft copolymer of about 89.2 parts by weight polypropylene and about 10.8 parts by weight methacrylic acid and a graft copolymer of about 55 parts by weight polypropylene and 45 parts by weight acrylic acid; wherein all graft copolymers were prepared utilizing techniques essentially as described herein.

The following Table I illustrates the compositions of the coating composition used, the coating techniques employed and the results obtained.

Reference to the data shown on Table I illustrates that only those graft copolymers, as defined by the present invention, are capable of providing the highly desirable and unexpected results.

In a series of additional tests, the coated test bars described as Samples 7, 8, 9 and 10 of Table I were subjected to the following tests, designed to measure the resistance of the coatings to the effects of temperature change, impact resistance, and resistance to the corrosive action of acidic and salt solutions.

*Test No. 1.*—Immersion of the coated test bar in a boiling 20 percent calcium chloride solution for three hours.

*Test No. 2.*—Immersion of the coated test bar in concentrated hydrochloric acid for 72 hours at room temperature.

*Test No. 3.*—Storage of the coated test bars in a Dry-Ice container for 72 hours following the testing described in Test No. 1, above. The test bars were struck with a hammer and examined visually for impact and corrosion resistance following exposure.

*Test No. 4.*—Immersion of the coated test bars in a 20 percent calcium chloride solution for 246 hours at room temperature.

All of such coated test bars were relatively unaffected by the tests.

In contrast, the test bars coated with the compositions identified as Samples 1 and 2 of Table I were vigorously attacked with a severe loss of coating adhesion and resistance to the corrosive action of acids and salts.

What is claimed is:

1. The method of forming adherent, corrosion resistant coatings to solid particles which comprises the sequential steps of:
   (1) forming a fluidized bed of a finely divided material consisting essentially of a thermoplastic graft copolymer of (a) 75 to 98 percent by weight of polypropylene and (b) 25 to 2 percent by weight of acrylic acid;
   (2) preheating said solid article to a temperature between about 250° C. to 400° C.;
   (3) placing said solid article in said fluidized bed for a period of up to about 7 seconds;

TABLE I

| Sample No. | Thermoplastic Resins | | Pre-Heat Temp., °C. | Post-Heat | | Test Bars Used | Appearance of Coated Test Bars |
| --- | --- | --- | --- | --- | --- | --- | --- |
| | Type | Average Particle Size, Microns | | Temp., °C. | Time, Min. | | |
| | FOR COMPARISON | | | | | | |
| 1 | Linear Polyethylene (Melt Index of 5). | 840 | 400 | 175 | 15 | Magnesium, Aluminum, Brass, Stainless Steel. | Discontinuous, non-adherent coatings on all test bars. |
| 2 | Branched Polyethylene (Melt Index of 58.4). | 1,000 | 400 | 175 | 10 | ----do---- | Smooth, non-adherent coating on all test bars. |
| 3 | Polypropylene (Melt Index of 0.37) | 840 | 300 | 170 | 10 | Magnesium, Aluminum, Stainless Steel. | Do. |
| 4 | Graft copolymer of 91.6 parts polyethylene and 8.4 parts acrylic acid. | 500 | 400 | 190 | 10 | Magnesium, Aluminum, Brass, Stainless Steel. | Discontinuous, non-adherent coatings on all test bars. |
| 5 | Graft copolymer of 89.2 parts polypropylene and 10.8 parts methacrylic acid. | 840 | 300 | 165 | 10 | Magnesium, Aluminum, Stainless Steel. | Do. |
| 6 | Graft copolymer of 55 parts polypropylene and 45 parts acrylic acid. | 500 | 400 | 175 | 10 | ----do---- | Do. |
| | THE INVENTION | | | | | | |
| 7 | Graft copolymer of 97.7 parts polypropylene and 2.3 parts acrylic acid. | 500 | 250–400 | 150–180 | 5–10 | Iron, Aluminum, Stainless Steel, Magnesium, Pyrex Glass. | Smooth, adherent coatings on all test bars. |
| 8 | Graft copolymer of 94.3 parts polypropylene and 5.7 parts acrylic acid. | 500 | 250–375 | 150–180 | 5–10 | ----do---- | Do. |
| 9 | Graft copolymer of 86 parts polypropylene and 14 parts acrylic acid. | 500 | 250–350 | 150–170 | 5–10 | ----do---- | Do. |
| 10 | Graft copolymer of 75 parts polypropylene and 25 parts acrylic acid. | 500 | 250–350 | 150–170 | 5–10 | ----do---- | Do. |

(4) removing said solid article from said fluidized bed; and (5) post-heating said solid article at a temperature between about 150° C. and 180° C. for a period of between about 5 and 10 minutes to provide uniformly smooth, adherent coatings of said thermoplastic graft copolymer on said solid article.

2. The method of claim 1, wherein said solid article is steel.

3. The method of claim 1, wherein said solid article is aluminum.

4. The method of claim 1, wherein said solid article is magnesium.

5. The method of claim 1, wherein said solid article is glass.

References Cited

UNITED STATES PATENTS

| | | | |
|---|---|---|---|
| 2,844,489 | 7/1958 | Gemmer | 117—21 |
| 2,924,584 | 2/1960 | Wolinski | 260—33.6 |
| 2,956,035 | 10/1960 | Mock | 260—23 |
| 2,970,129 | 1/1961 | Rugg et al. | 260—878 |
| 2,974,059 | 3/1961 | Gemmer | 117—21 |
| 2,987,501 | 6/1961 | Rieke et al. | 260—877 |
| 3,020,174 | 2/1962 | Natta et al. | 117—47 |
| 3,079,312 | 2/1963 | Alsys | 204—159.17 |
| 3,177,269 | 4/1965 | Nowak et al. | 260—878 |

WILLIAM D. MARTIN, *Primary Examiner.*

P. F. ATTAGUILE, *Assistant Examiner.*